(12) United States Patent
Ahn et al.

(10) Patent No.: US 7,977,421 B2
(45) Date of Patent: Jul. 12, 2011

(54) BROMINATED DIPHENYL ETHANE MIXTURES AND RESIN COMPOSITIONS INCLUDING THE SAME

(75) Inventors: Sung Hee Ahn, Seoul (KR); Se Bum Son, Anyang-si (KR); In Hwan Oh, Uiwang-si (KR); Sung Duk Hwang, Seoul (KR); Seong Ho Kong, Seoul (KR); Hye Jin Lee, Uiwang-si (KR); Jin Pyung Jeong, Bucheon-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/512,134

(22) Filed: Jul. 30, 2009

(65) Prior Publication Data

US 2010/0029828 A1    Feb. 4, 2010

(30) Foreign Application Priority Data

Jul. 30, 2008 (KR) .................. 2008-74784
Oct. 31, 2008 (KR) .................. 2008-108065
May 21, 2009 (KR) .................. 2009-44338

(51) Int. Cl.
*C08K 5/03* (2006.01)

(52) U.S. Cl. .................. 524/466; 524/469; 570/183

(58) Field of Classification Search .................. 570/183; 524/466, 469
See application file for complete search history.

(56) References Cited

U.S. PATENT DOCUMENTS

| | | | | |
|---|---|---|---|---|
| 5,039,729 A | * | 8/1991 | Brackenridge et al. | 524/412 |
| 5,055,235 A | * | 10/1991 | Brackenridge et al. | 252/609 |
| 5,712,336 A | * | 1/1998 | Gareiss et al. | 524/373 |
| 6,117,371 A | * | 9/2000 | Mack | 252/609 |
| 7,288,587 B2 | * | 10/2007 | Saitou et al. | 524/464 |
| 2005/0137311 A1 | * | 6/2005 | Muylem et al. | 524/464 |
| 2008/0160240 A1 | | 7/2008 | Son et al. | |
| 2008/0221255 A1 | | 9/2008 | Ahn et al. | |
| 2010/0029828 A1 | | 2/2010 | Ahn et al. | |
| 2010/0152372 A1 | | 6/2010 | Oh et al. | |

OTHER PUBLICATIONS

Office Action in commonly owned U.S. Appl. No. 12/647,620, mailed on Jan. 31, 2011, pp. 1-10.
Office Action in commonly owned U.S. Appl. No. 12/628,258, mailed on Mar. 24, 2011, pp. 1-22.

* cited by examiner

*Primary Examiner* — Peter Szekely

(74) *Attorney, Agent, or Firm* — Summa, Additon & Ashe, P.A.

(57) ABSTRACT

A brominated diphenyl ethane mixture of the present invention comprises about 0 to about 2% by weight of pentabromodiphenyl ethane, about 55 to 85% by weight of hexabromodiphenyl ethane, about 1 to 20% by weight of heptabromodiphenyl ethane, about 1 to 25% by weight of octabromodiphenyl ethane, about 0 to about 10% by weight of nonabromodiphenyl ethane, and about 0 to about 5% by weight of decabromodephenyl ethane. The brominated diphenyl ethane mixture can be added to thermoplastic resin as a flame retardant, can exhibit excellent compatibility with thermoplastic resins, can minimize the generation of environmental problems, and can obtain excellent impact resistance, thermal stability, weatherability and flowability as well as improved flame resistance.

21 Claims, No Drawings

US 7,977,421 B2

BROMINATED DIPHENYL ETHANE MIXTURES AND RESIN COMPOSITIONS INCLUDING THE SAME

CROSS REFERENCE TO RELATED APPLICATIONS

This application claims priority from Korean Patent Application No. 2008-74784, filed Jul. 30, 2008; Korean Patent Application No. 2008-108065, filed Oct. 31, 2008; and Korean Patent Application No. 2009-44338, filed May 21, 2009, in the Korean Intellectual Property Office, the disclosure of each of which is incorporated herein by reference in its entirety.

FIELD OF THE INVENTION

The present invention relates to brominated diphenyl ethane mixtures and resin compositions including the same.

BACKGROUND OF THE INVENTION

In general, thermoplastic resins are used in a variety of articles because of their excellent mechanical properties and high structural stabilities.

In order to reduce the risk of a fire, halogenated flame retardants may be added to some thermoplastic resins. Halogenated flame retardants generally used include TBBPA (2,2', 6,6'-tetrabromo-4,4'-isopropylidenediphenol), tris(tribromophenoxy)triazine, and decabromodiphenyl ethane (DBDPE), among others.

However, TBBPA can cause environmental problems and is easily degraded when TBBPA is processed at high temperatures due to its low thermal decomposition temperature. Moreover, TBBPA has poor compatibility with some vinyl-based polymers due to a hydroxyl (—OH) group structurally present in TBBPA. Therefore, its uses are limited. Even the use of TBBPA in the form of a brominated epoxy oligomer may not fundamentally prevent the environmental problems associated with TBBPA.

In order to address the drawbacks associated with TBBPA, tris(tribromophenoxy)triazine has been used as a flame retardant. Tris(tribromophenoxy)triazine, however, is also not desirable environmentally since tris(tribromophenoxy)triazine is produced using tribromophenol.

DBDPE can have excellent environmental properties among the halogenated flame retardants. However, it can be difficult to use DBDPE with some thermoplastic resins since DBDPE has a very high melting point and poor compatibility. Additionally, DBDPE has very limited uses since DBDPE-added resins can exhibit greatly reduced impact resistant strength and decreased flowability.

SUMMARY OF THE INVENTION

The present inventors have developed diphenyl ethane mixtures which can be useful as flame retardants. The diphenyl ethane mixtures of the invention are partially brominated and have specific compositions. The brominated diphenyl ethane mixtures can provide excellent flame resistance, thermal stability, and compatibility with a variety of thermoplastic resins. In addition, the brominated diphenyl ethane mixtures of the invention can minimize generation of environmental problems and improve impact strength, liquidity and thermal stability of resins.

The present invention also provides resin compositions including the brominated diphenyl ethane mixtures. The brominated diphenyl ethane mixtures of the invention can substantially minimize degradation of inherent physical properties of the resin. Accordingly, the resin compositions of the invention can exhibit excellent impact resistance, coloration resistance, and flowability as well as flame resistance.

The present invention further provides a molded article produced from the aforementioned resin composition.

The present invention also provides a method of simultaneously improving impact resistance, flowability and flame resistance of a thermoplastic resin by using the brominated diphenyl ethane mixture as a flame retardant.

According to one aspect of the present invention, there is provided a novel brominated diphenyl ethane mixture. The brominated diphenyl ethane mixture comprises about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane, and about 0 to about 5% by weight of decabromodephenyl ethane.

In an exemplary embodiment of the present invention, the brominated diphenyl ethane mixture may comprise about 0 to about 2% by weight of pentabromodiphenyl ethane, about 60 to about 85% by weight of hexabromodiphenyl ethane, about 1 to about 15% by weight of heptabromodiphenyl ethane, about 5 to about 25% by weight of octabromodiphenyl ethane, about 0 to about 9% by weight of nonabromodiphenyl ethane, and about 0 to about 5% by weight of decabromodephenyl ethane. In another embodiment of the present invention, the brominated diphenyl ethane mixture may comprise about 1 to about 10% by weight of heptabromodiphenyl ethane.

In another embodiment of the present invention, the brominated diphenyl ethane mixture may comprise about 55 to about 75% by weight of hexabromodiphenyl ethane, about 11 to about 16% by weight of heptabromodiphenyl ethane, about 10 to about 20% by weight of octabromodiphenyl ethane, about 1 to about 9% by weight of nonabromodiphenyl ethane.

In another embodiment of the present invention, the brominated diphenyl ethane mixture may comprise about 0.1 to about 2% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, and about 1 to about 7% by weight of nonabromodiphenyl ethane.

In another embodiment of the present invention, the brominated diphenyl ethane mixture may comprise about 0.1 to about 2% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, about 1 to about 7% by weight of nonabromodiphenyl ethane, and about 0.01 to about 1% by weight of decabromodephenyl ethane.

In another embodiment of the present invention, the brominated diphenyl ethane mixture may comprise about 55 to about 83% by weight of hexabromodiphenyl ethane, about 7 to about 17% by weight of heptabromodiphenyl ethane, about 5 to about 23% by weight of octabromodiphenyl ethane, about 1 to about 7% by weight of nonabromodiphenyl ethane, and about 0.01 to about 1% by weight of decabromodephenyl ethane.

In another embodiment of the present invention, the brominated diphenyl ethane mixture may further comprise about 0 to about 2% by weight of one or more bromodiphenyl ethane compounds selected from monobromodiphenyl ethane, dibromodiphenyl ethane, tribromodiphenyl ethane, and tetrabromodiphenyl ethane.

In another embodiment of the present invention, the brominated diphenyl ethane mixture may comprise about 1 to about 25% by weight of a mixture of pentabromodiphenyl ethane, heptabromodiphenyl ethane, and nonabromodiphenyl ethane. In another embodiment of the present invention, the brominated diphenyl ethane mixture may comprise about 1 to about 20% by weight of a mixture of pentabromodiphenyl ethane, heptabromodiphenyl ethane, and nonabromodiphenyl ethane. In another embodiment of the present invention, the brominated diphenyl ethane mixture may comprise about 1 to about 15% by weight of a mixture of pentabromodiphenyl ethane, heptabromodiphenyl ethane, and nonabromodiphenyl ethane.

Further, the brominated diphenyl ethane mixture may have an average bromine content of about 64 to about 81% by weight. In another embodiment of the present invention, the brominated diphenyl ethane mixture may have an average bromine content of about 72 to about 80% by weight.

According to another aspect of the present invention, there is provided a resin composition including the aforementioned brominated diphenyl ethane mixture as a flame retardant. The resin composition may comprise about 100 parts by weight of a thermoplastic resin (A); and about 1 to about 30 parts by weight of the brominated diphenyl ethane mixture (B). In another embodiment of the present invention, the resin composition may comprise about 100 parts by weight of the thermoplastic resin (A); and about 5 to about 25 parts by weight of the brominated diphenyl ethane mixture (B). In another embodiment of the present invention, the resin composition may comprise about 100 parts by weight of the thermoplastic resin (A); and about 10 to about 22 parts by weight of the brominated diphenyl ethane mixture (B).

Exemplary thermoplastic resins (A) include without limitation one or more polyolefins, aromatic vinyl based polymers, rubber-modified aromatic vinyl polymers, rubber modified aromatic vinyl-vinyl cyanide copolymers, aromatic vinyl-vinyl cyanide copolymers, polyvinyl chloride, polyesters, polyamides, polyphenylene oxides, polyphenylene sulfides, polycarbonates, and the like, and combinations thereof.

Further, the resin composition may comprise one or more additives. Exemplary additives include without limitation flame retardants, flame retarding aids, anti-dripping agents, heat stabilizers, release agents, weatherability stabilizers, halogen stabilizers, lubricants, fillers, light stabilizers, antioxidants, coloring agents, antistatic agents, impact modifiers, and the like, and combinations thereof.

According to a further aspect of the present invention, there is provided a molded article produced from the aforementioned resin composition. In an exemplary embodiment of the present invention, the molded article may include pellets produced by extruding the resin composition. In another exemplary embodiment of the present invention, the molded article may include exterior materials for electric and electronic products.

When the thermoplastic resin is an acrylonitrile butadiene styrene (ABS) copolymer, the molded article may have an Izod impact strength of about 12 to about 60 kgf·cm/cm for a ⅛" thick sample measured according to ASTM 256, a melt flow index of about 0.2 to about 20 g/10 min measured at 200° C. according to ASTM D-1238, a flame retardancy of V-0 for a ⅛" thick sample measured according to UL 94 VB flame resistance regulations, and a color change about 10 or less based on ΔE measured after a residence time of 10 minutes at 250° C.

In another embodiment of the present invention, when the thermoplastic resin is a rubber modified polystyrene resin (HIPS), the molded article may have an Izod impact strength of about 6 to about 25 kgf·cm/cm for a ⅛" thick sample measured according to ASTM 256, a melt flow index of about 2 to about 40 g/10 min measured at 200° C. according to ASTM D-1238, a flame retardancy of V-0 for a ⅛" thick sample measured according to UL 94 VB flame resistance regulations, and a color change of about 10 or less based on ΔE measured after a residence time of 10 minutes at 250° C.

In another embodiment of the present invention, when the thermoplastic resin is polyamide (PA), the molded article may have an Izod impact strength of about 10 to about 120 kgf·cm/cm for a ⅛" thick sample measured according to ASTM 256, a melt flow index of about 3 to about 200 g/10 min measured at 265° C. according to ASTM D-1238, a flame retardancy of V-0 measured for a ⅛" thick sample according to UL 94 VB flame resistance regulations, and a color change of about 20 or less based on ΔE measured after a residence time of 10 minutes at 250° C.

In another embodiment of the present invention, when the thermoplastic resin is polyphenylene ether (PPE), the molded article may have an Izod impact strength of about 3 to about 50 kgf·cm/cm for a ⅛" thick sample measured according to ASTM 256, a melt flow index of about 0.1 to about 100 g/10 min measured at 220° C. according to ASTM D-1238, a flame retardancy of V-0 for a ⅛" thick sample according to UL 94 VB flame resistance regulations, and a color change of about 10 or less based on ΔE measured after a residence time of 10 minutes at 250° C.

In another embodiment of the present invention, when the thermoplastic resin is polyethylene terephthalate (PET), the molded article may have an Izod impact strength of about 3 to about 70 kgf·cm/cm for a ⅛" thick sample measured according to ASTM 256, a melt flow index of about 1 to about 100 g/10 min measured at 250° C. according to ASTM D-1238, a flame retardancy of V-0 for a ⅛" thick sample measured according to UL 94 VB flame resistance regulations, and a color change of about 20 or less based on ΔE measured after a residence time of 10 minutes at 250° C.

In another embodiment of the present invention, when the thermoplastic resin is polypropylene (PP), the molded article may have an Izod impact strength of about 3 to about 70 kgf·cm/cm for a ⅛" thick sample measured according to ASTM 256, a melt flow index of about 1 to about 100 g/10 min measured at 230° C. according to ASTM D-1238, a flame retardancy of V-0 for a ⅛" thick sample measured according to UL 94 VB flame resistance regulations, and a color change of about 10 or less based on ΔE measured after a residence time of 10 minutes at 220° C.

According to a still further aspect of the present invention, there is provided a method of simultaneously improving impact resistance, flowability and flame resistance of a thermoplastic resin. The method comprises adding a brominated diphenyl ethane mixture as a flame retardant to a thermoplastic resin, wherein the brominated diphenyl ethane mixture comprises about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane and about 0 to about 5% by weight of decabromodephenyl ethane and has a bromine content of about 72 to about 80% by weight.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Brominated Diphenyl Ethane Mixture

One aspect of the present invention relates to a novel brominated diphenyl ethane mixture. The brominated diphenyl ethane mixture can be prepared by addition reaction of bromine with diphenyl ethane.

In an exemplary embodiment of the present invention, a brominated diphenyl ethane mixture of the present invention can be prepared by adding about 64 to about 81% by weight, for example about 70 to about 80% by weight, and as another example about 72 to about 79% by weight, of bromine to diphenyl ethane; reacting diphenyl ethane with the added bromine; and refining brominated diphenyl ethane from a mixture of reaction products. In another exemplary embodiment, the brominated diphenyl ethane mixture may be prepared by injecting bromine into a reactor filled with diphenyl ethane, a solvent and a catalyst and reacting bromine with diphenyl ethane for about 0.5 to about 3 hours while the reactor is maintained at a temperature of about −10 to about 35° C.

The catalyst can include without limitation a metal, a bromide or a chloride of a metal, including a bromide or a chloride of aluminum or antimony, or a combination thereof. Exemplary catalysts include without limitation Al, Sb, Fe, Ti, Sn, Be, Cd, Zn, B, Bi, $AlCl_3$, $SbCl_3$, $SbCl_5$, $SbBr_3$, $SbClBr_4$, $SbBrCl_4$, $FeCl_3$, $FeBr_3$, $TiCl_4$, $TiBr_4$, $SnCl_2$, $SnBr_3$, $SnCl_4$, $AlBr_3$, $BeCl_2$, $CdCl_2$, $ZnCl_2$, $BF_4$, $BCl_3$, $BBr_3$, $BiCl_3$, and the like. The catalyst may be used in an amount of about 0.01 to about 3 moles per 1 mole of diphenyl ethane. In another embodiment, the catalyst may be used in an amount of about 0.01 to about 1.5 moles per 1 mole of diphenyl ethane.

The solvent may comprise any solvent which can dissolve diphenyl ethane well and is inert to metals, Lewis acidic metal salts, bromine, and bromine chloride. Exemplary solvents include without limitation methylene chloride, chloroform, carbon tetrachloride, 1,2-dichloroethane, 1,1,1-trichloroethane, 1,1,2,2-tetrachloroethane, methylene bromide, methyl bromide, tetrabromomethane, 1,2-dibromoethane, 1,1,1-tribromoethane, 1,1,2,2-tetrabromoethane, and the like. The chlorine-based organic solvents may be used singly or in combination. Among chlorine- or bromine-based organic solvents, the aromatic solvents such as chlorobenzene, o,m,p-dichlorobenzene, bromobenzene, o,m,p-dibromobenzene, and the like are not preferable since bromine is substituted with aromatic nuclei.

The bromine may be injected into the diphenyl ethane in a ratio range of about 5 to about 9 moles, for example about 6.0 to about 8.5 moles, and as another example about 6.2 to about 8.3 moles, per mole of diphenyl ethane, so that about 6.5 to about 8.5 hydrogens are substituted within the diphenyl ethane.

After finishing the reaction, the organic phase may be cleaned with an aqueous alkali solution or alkali sulfate in order to remove a Lewis acidic metal salt catalyst, bromine or bromine chloride remaining in an organic phase. When metal is used as a catalyst, the metal can be cleaned and removed with an aqueous acidic solution. Also, if halogen remaining in a small amount becomes a problem, non-reacted halogen may be adsorbed and removed by passing the organic phase through an activated carbon layer or adding granular activated carbon into the organic phase after cleaning an organic phase. Thereafter, a reactant can be filtered or subjected to separation methods including centrifugal separation and the like, thereby separating a precipitate and an organic phase. The separated organic phase can be injected into a large amount of non-commercial solvents including methanol to thereby separate a precipitate. The precipitates separated in the respective steps are dried to recover brominated dimethyl ethane. The recovering method is not limited to the foregoing method, but other well known methods may also be used as the recovering method.

In an exemplary embodiment, the brominated diphenyl ethane mixture may be a mixture of hexabromodiphenyl ethane, heptabromodiphenyl ethane, and octabromodiphenyl ethane. In another embodiment, the brominated diphenyl ethane mixture may further include pentabromodiphenyl ethane, nonabromodiphenyl ethane, decabromodiphenyl ethane, low molecular weight hydrocarbons, or a combination thereof. The low molecular weight hydrocarbons may include monobromodiphenyl ethane, dibromodiphenyl ethane, tribromodiphenyl ethane, tetrabromodiphenyl ethane, and the like, and combinations thereof.

In one embodiment based on an area ratio in a GC/MS (Gas Chromatography/Mass Spectrometry) analysis, the brominated diphenyl ethane mixture may comprise about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane, and about 0 to about 5% by weight of decabromodephenyl ethane.

In another embodiment, the brominated diphenyl ethane mixture may comprise about 0 to about 2% by weight of pentabromodiphenyl ethane, about 60 to about 85% by weight of hexabromodiphenyl ethane, about 1 to about 15% by weight of heptabromodiphenyl ethane, about 5 to about 25% by weight of octabromodiphenyl ethane, about 0 to about 9% by weight of nonabromodiphenyl ethane, and about 0 to about 5% by weight of decabromodephenyl ethane.

In another embodiment, the brominated diphenyl ethane mixture may comprise about 1 to about 2% by weight of pentabromodiphenyl ethane, about 80 to about 85% by weight of hexabromodiphenyl ethane, about 13 to about 18% by weight of heptabromodiphenyl ethane, and about 1 to about 5% by weight of octabromodiphenyl ethane.

In another embodiment, the brominated diphenyl ethane mixture may comprise about 0.8 to about 2% by weight of pentabromodiphenyl ethane, about 72 to about 80% by weight of hexabromodiphenyl ethane, about 12 to about 15% by weight of heptabromodiphenyl ethane, about 5 to about 10% by weight of octabromodiphenyl ethane, and about 0.1 to about 2% by weight of nonabromodiphenyl ethane.

In another embodiment, the brominated diphenyl ethane mixture may comprise about 0.8 to about 2% by weight of pentabromodiphenyl ethane, about 71 to about 80% by weight of hexabromodiphenyl ethane, about 12 to about 15% by weight of heptabromodiphenyl ethane, about 5 to about 11% by weight of octabromodiphenyl ethane, and about 0.1 to about 4% by weight of nonabromodiphenyl ethane.

In another embodiment, the brominated diphenyl ethane mixture may comprise about 55 to about 75% by weight of hexabromodiphenyl ethane, about 11 to about 16% by weight of heptabromodiphenyl ethane, about 10 to about 20% by weight of octabromodiphenyl ethane, and about 1 to about 9% by weight of nonabromodiphenyl ethane.

In another embodiment, the brominated diphenyl ethane mixture may comprise about 0.1 to about 2% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, and about 1 to about 7% by weight of nonabromodiphenyl ethane.

In another embodiment, the brominated diphenyl ethane mixture may comprise about 0.1 to about 2% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, about 1 to about 7% by weight of nonabromodiphenyl ethane, and about 0.01 to about 1% by weight of decabromodephenyl ethane.

In another embodiment, the brominated diphenyl ethane mixture may comprise about 55 to about 83% by weight of hexabromodiphenyl ethane, about 7 to about 17% by weight of heptabromodiphenyl ethane, about 5 to about 23% by weight of octabromodiphenyl ethane, about 1 to about 7% by weight of nonabromodiphenyl ethane, and about 0.01 to about 1% by weight of decabromodephenyl ethane.

In another embodiment, the brominated diphenyl ethane mixture may further comprise about 0 to about 2% by weight of one or more bromodiphenyl ethane compounds selected from monobromodiphenyl ethane, dibromodiphenyl ethane, tribromodiphenyl ethane, and tetrabromodiphenyl ethane.

In another embodiment, the brominated diphenyl ethane mixture may further comprise about 0.01 to about 1.8% by weight of one or more bromodiphenyl ethane compounds selected from monobromodiphenyl ethane, dibromodiphenyl ethane, tribromodiphenyl ethane, and tetrabromodiphenyl ethane.

In another embodiment, the brominated diphenyl ethane mixture may comprise about 0.1 to about 1.6% by weight of one or more bromodiphenyl ethane compounds selected from monobromodiphenyl ethane, dibromodiphenyl ethane, tribromodiphenyl ethane and tetrabromodiphenyl ethane, about 0.1 to about 2% by weight of pentabromodiphenyl ethane, about 63 to about 70% by weight of hexabromodiphenyl ethane, about 10 to about 13% by weight of heptabromodiphenyl ethane, about 10 to about 25% by weight of octabromodiphenyl ethane, about 1 to about 5% by weight of nonabromodiphenyl ethane, and about 0.1 to about 2% by weight of decabromodephenyl ethane.

In another embodiment, the brominated diphenyl ethane mixture may comprise about 57 to about 85% by weight, for example about 60 to about 85% by weight, as another example about 65 to about 85% by weight, and as another example about 70 to about 85% by weight of hexabromodiphenyl ethane.

In the present invention, the content of pentabromodiphenyl ethane, heptabromodiphenyl ethane, and nonabromodiphenyl ethane can be reduced. If the bromodiphenyl ethane includes an odd number of bromine substituents, it may be structurally unstable and can thereby deteriorate thermal properties or weatherability and discoloration phenomena of resins.

In an exemplary embodiment, the brominated diphenyl ethane mixture may comprise about 1 to about 25% by weight of a mixture of pentabromodiphenyl ethane, heptabromodiphenyl ethane, and nonabromodiphenyl ethane.

In another exemplary embodiment, the brominated diphenyl ethane mixture may comprise about 1 to about 10% by weight of heptabromodiphenyl ethane.

The brominated diphenyl ethane mixture may have an average bromine content of about 64 to about 81% by weight. In another embodiment, the brominated diphenyl ethane mixture may have an average bromine content of about 72 to about 80% by weight. A brominated diphenyl ethane mixture having a bromine content within these ranges can exhibit a balance of excellent physical properties, such as impact strength, flowability and flame resistance. If the bromine content exceeds about 81% by weight, impact resistant strength and flowability of the brominated diphenyl ethane mixture can substantially deteriorate.

Resin Composition

Another aspect of the present invention relates to a resin composition using the brominated diphenyl ethane mixture as a flame retardant. The resin composition may comprise a thermoplastic resin (A) and a brominated diphenyl ethane mixture (B).

Thermoplastic resins capable of being used in the present invention may include all resins having thermoplastic properties and are not particularly limited. Exemplary thermoplastic resins may include without limitation polyolefins, aromatic vinyl based polymers, rubber-modified aromatic vinyl polymers, rubber modified aromatic vinyl-vinyl cyanide copolymers, aromatic vinyl-vinyl cyanide copolymers, polyvinyl chloride, polyesters, polyamides, polyphenylene oxides, polyphenylene sulfides, polycarbonates, polyethers, and the like, and combinations thereof. The thermoplastic resins may be used singly or as a combination of two or more thereof.

In an exemplary embodiment, the thermoplastic resin can be used as a structural material and includes a polymer with about 15,000 Daltons or more.

In an exemplary embodiment, the thermoplastic resin includes polyethylene, polypropylene, polystyrene, ABS, HIPS, polyester, polyamide, polyoxide, or a combination thereof.

In another exemplary embodiment, the thermoplastic resin may comprise a styrene-based resin in which rubber, a styrene-based monomer, an alkyl ester monomer and/or an unsaturated nitrile-based monomer are mixed. Alternatively, the thermoplastic resin may comprise a styrene-based copolymer resin in which a styrene-based monomer and an unsaturated nitrile-based monomer are polymerized. Exemplary thermoplastic resins in accordance with this embodiment of the invention may comprise without limitation GPPS, sPS, HIPS, ABS, ASA, SAN, MSAN and MABS resins, and the like and combinations thereof.

In another exemplary embodiment, the thermoplastic resin may comprise a polyolefin resin. Exemplary polyolefin resins may comprise without limitation polyethylene, polypropylene, modified polyolefin modified, such as polyolefin modified by a glycidyl or (meth)acrylate group, and the like, and combinations thereof. The polyethylene may be in the form of any one of HDPE, LDPE, LLDPE, and the like, and the polyethylene may be used in any structures including atactic, syndiotactic and isotactic structures. Alternatively, the polyethylene may be used in the form of a copolymer of a polyolefin and a monomer having another ethylenic unsaturated group.

In another exemplary embodiment, the thermoplastic resin may comprise poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, a copolymer of poly(2,6-dimethyl-1,4-phenylene)ether and poly(2,3,6-trimethyl-1,4-phenylene)ether, a copolymer of poly(2,6-dimethyl-1,4-phenylene)ether and poly(2,3,5-triethyl-1,4-phenylene)ether, mixtures thereof, or alloys thereof with aromatic vinyl-based copolymers.

The thermoplastic resin may also comprise terephthalate ester-based resins such as polyethylene terephthalate, polybutylene terephthalate, glycidyl modified polyester such as PETG, and the like, and combinations thereof.

The thermoplastic resin of the present invention is not limited to the exemplified resins. The exemplified resins may also be used singly or in the form of alloys or mixtures obtained by blending two or more thereof.

In the present invention, the brominated diphenyl ethane mixture (B) is used in an amount range of about 1 to about 30 parts by weight based on about 100 parts by weight of the thermoplastic resin (A). This range of the brominated diphenyl ethane mixture can provide an optimum balance of physical properties. For example, the brominated diphenyl ethane mixture (B) can be used in an amount ranging from about 5 to about 27 parts by weight based on about 100 parts by weight of the thermoplastic resin (A). In another embodiment, the resin composition may comprise about 100 parts by weight of the thermoplastic resin (A) and about 5 to about 25 parts by weight of the brominated diphenyl ethane mixture (B). In yet another embodiment, the resin composition may comprise about 100 parts by weight of the thermoplastic resin (A) and about 10 to about 22 parts by weight of the brominated diphenyl ethane mixture (B).

A resin composition of the present invention may further comprise one or more additives. Exemplary additives include without limitation flame retardants, flame retarding aids, anti-dripping agents, heat stabilizers, release agents, weatherability stabilizers, halogen stabilizers, lubricants, fillers, light stabilizers, antioxidants, coloring agents, antistatic agents, and impact modifiers. The additives may be used singly or in combination of two or more thereof. The flame retardant may comprise other halogen-based flame retardants as well as bromine-based flame retardants. Phosphorous-based flame retardants may also used together. The flame retarding aid may comprise an antimony oxide including antimony trioxide, antimony pentoxide, metal antimonite, or a combination thereof.

In a further aspect of the present invention, there is provided a method of preparing a thermoplastic resin composition. The preparation method comprises the steps of reacting bromine with diphenyl ethane to synthesize bromodiphenyl ethane with a bromine content of about 72 to about 80% by weight; and mixing a thermoplastic resin with the bromodiphenyl ethane and extruding the mixture. The bromodiphenyl ethane comprises about 0 to about 2% by weight of pentabromodiphenyl ethane, about 55 to 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane, and about 0 to about 5% by weight of decabromodephenyl ethane.

A resin composition of the present invention may be prepared in the form of pellets by melt-extruding the mixture in an extruder after simultaneously mixing the aforementioned components with other (optional) additives. The prepared pellets may be produced into various molded articles through diverse molding methods including injection molding, extrusion molding, vacuum molding, and casting molding.

In a still further aspect of the present invention, there is provided a molded article obtained by molding the aforementioned resin composition. The molded article may be used in a wide range of exterior materials for electronic products, computer housings, and housings for other business machines since the molded article can have excellent impact resistance, flowability, and flame resistance.

When the thermoplastic resin is an acrylonitrile butadiene styrene (ABS) copolymer, the molded article can have an Izod impact strength of about 12 to 60 kgf·cm/cm for a 1/8" thick sample measured according to ASTM 256, a melt flow index of about 0.2 to 20 g/10 min measured at 200° C. according to ASTM D-1238, a flame retardancy of V-0 for a 1/8" thick sample measured according to UL 94 VB flame resistance regulations, and a color change of about 10 or less based on ΔE measured after a residence time of 10 minutes at 250° C.

In another embodiment, when the thermoplastic resin is a rubber modified polystyrene (HIPS) resin, the molded article can have an Izod impact strength of about 6 to about 25 kgf·cm/cm for a 1/8" thick sample measured according to ASTM 256, a melt flow index of about 2 to 4 about 0 g/10 min measured at 200° C. according to ASTM D-1238, a flame retardancy of V-0 for a 1/8" thick sample measured according to UL 94 VB flame resistance regulations, and a color change of about 10 or less based on ΔE measured after a residence time of 10 minutes at 250° C.

In another embodiment, when the thermoplastic resin is polyamide (PA), the molded article can have an Izod impact strength of about 10 to about 120 kgf·cm/cm for a 1/8" thick sample measured according to ASTM 256, a melt flow index of about 3 to about 200 g/10 min measured at 265° C. according to ASTM D-1238, a flame retardancy of V-0 for a 1/8" thick sample measured according to UL 94 VB flame resistance regulations, and a color change of about 20 or less based on ΔE measured after a residence time of 10 minutes at 250° C.

In another embodiment, when the thermoplastic resin is polyphenylene ether (PPE), the molded article can have an Izod impact strength of about 3 to about 50 kgf·cm/cm for a 1/8" thick sample measured according to ASTM 256, a melt flow index of about 0.1 to about 100 g/10 min measured at 220° C. according to ASTM D-1238, a flame retardancy of V-0 for a 1/8" thick sample measured according to UL 94 VB flame resistance regulations, and a color change of about 10 or less based on ΔE measured after a residence time of 10 minutes at 250° C.

In another embodiment, when the thermoplastic resin is polyethylene terephthalate (PET), the molded article can have an Izod impact strength of about 3 to about 70 kgf·cm/cm for a 1/8" thick sample measured according to ASTM 256, a melt flow index of about 1 to about 100 g/10 min measured at 250° C. according to ASTM D-1238, a flame retardancy of V-0 for a 1/8" thick sample measured according to UL 94 VB flame resistance regulations, and a color change of about 20 or less based on ΔE measured after a residence time of 10 minutes at 250° C.

In another embodiment, when the thermoplastic resin is polypropylene (PP), the molded article can have an Izod impact strength of about 3 to about 70 kgf·cm/cm for a 1/8" thick sample measured according to ASTM 256, a melt flow index of about 1 to about 100 g/10 min measured at 230° C. according to ASTM D-1238, a flame retardancy of V-0 for a 1/8" thick sample measured according to UL 94 VB flame resistance regulations, and a color change of about 10 or less based on ΔE measured after a residence time of 10 minutes at 220° C.

According to a still further aspect of the present invention, there is provided a method of simultaneously improving impact resistance, flowability and flame resistance of a thermoplastic resin. The method comprises the step of adding, as a flame retardant, a brominated diphenyl ethane mixture comprising about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane and about 0 to about 5% by weight of decabromodephenyl ethane and having a bromine content of about 72 to about 80% by weight to a thermoplastic resin.

The invention may be better understood by reference to the following examples which are intended for the purpose of illustration and are not to be construed as in any way limiting the scope of the present invention, which is defined in the claims appended hereto.

EXAMPLES

Examples 1 to 5

Preparation of Brominated Diphenyl Ethane Mixtures

Example 1

Preparation of B1

After injecting 111 g of dichloroethane and 208.6 g of bromine into a 500 ml four-neck round-bottom flask equipped with a thermometer, a stirrer and a cooling tube, the mixture thereof is cooled to −5° C. while being stirred. Subsequently, 156 g of dichloroethane, 36.4 g of diphenyl ethane and 0.91 g of ferric chloride are injected into a 1 L four-neck round-bottom flask, and the mixture thereof is stirred and then dissolved. After titrating the previously prepared bromine solution into the dissolved solution at 10° C. for 4 hours and heating the solution, the heated solution is aged at 25° C. for 2 hours. When about 75% of the bromine solution is titrated, crystals of the solution began precipitating, and a reaction solution finally becomes a slurry state.

After completing the reaction, a solvent is distilled from the solution by injecting 280 g of water and 0.8 g of hydrazine into a reactor, removing bromine remaining in the reactor, and heating the bromine-removed solution. 130.6 g of an ivory-colored brominated diphenyl ethane mixture (B1) is obtained by distilling and filtering all of the solvent, washing the resulting material with water, and drying it at 100° C. for 4 hours. The brominated diphenyl ethane mixture is obtained to a high yield of 95% based on the injected diphenyl ethane. CG/MS and element analysis results of such an obtained brominated diphenyl ethane mixture are represented in Table 1. The average number of bromines substituted in the brominated diphenyl ethane is 6.4.

Example 2

Preparation of B2

The preparation process is carried out in the same method as Preparation Example 1 except that a bromine solution prepared by injecting 220 g of bromine into 111 g of dichloroethane is titrated. A prepared brominated diphenyl ethane mixture (B2) is 135.8 g.

Example 3

Preparation of B3

The preparation process is carried out in the same method as Preparation Example 1 except that a bromine solution prepared by injecting 228.2 g of bromine into 111 g of dichloroethane is titrated. A prepared brominated diphenyl ethane mixture (B3) is 139.5 g.

Example 4

Preparation of B4

The preparation process is carried out in the same method as Preparation Example 1 except that a bromine solution prepared by injecting 239.6 g of bromine into 111 g of dichloroethane is titrated. A prepared brominated diphenyl ethane mixture (B4) is 144.8 g.

Example 5

Preparation of B5

The preparation process is carried out in the same method as Preparation Example 1 except that a bromine solution prepared by injecting 251 g of bromine into 111 g of dichloroethane is titrated. A prepared brominated diphenyl ethane mixture (B5) is 150.1 g.

Example 6

Preparation of B6

After injecting 111 g of dichloroethane and 239.6 g of bromine into a 500 ml four-neck round-bottom flask equipped with a thermometer, a stirrer and a cooling tube, temperature of the mixture thereof is maintained at −5° C. while stirring the mixture. Subsequently, 156 g of dichloroethane, 36.4 g of diphenyl ethane and 0.91 g of zirconium chloride are injected into a 1 L four-neck round-bottom flask, and the mixture thereof is stirred and then dissolved. After titrating the previously prepared bromine solution into the dissolved solution at 50° C. for 4 hours and heating the solution, the heated solution is aged at 70° C. for 2 hours. When about 75% of the bromine solution is titrated, crystals of the solution began precipitating, and a reaction solution finally becomes a slurry state.

After completing the reaction, a solvent is distilled from the solution by injecting 280 g of water and 0.8 g of hydrazine into a reactor, removing bromine remaining in the reactor, and heating the bromine-removed solution. 147 g of an ivory-colored brominated diphenyl ethane mixture (B6) is obtained by distilling and filtering all of the solvent, washing the resulting material with water, and drying it at 100° C. for 4 hours. The brominated diphenyl ethane mixture is obtained to a high yield of 95.1% based on the injected diphenyl ethane. CG/MS and element analysis results of such an obtained brominated diphenyl ethane mixture are represented in Table 1. The average number of bromines substituted in the brominated diphenyl ethane is 7.5.

Preparation of a Thermoplastic Resin Composition (A) Thermoplastic Resins (A1) ABS: SD-0150 produced by Cheil Industries Inc. is used.

(A2) HIPS: HF-1690H produced by Cheil Industries Inc. is used.

(A3) Polypropylene: HJ-400 produced by Samsung Total Petrochemicals Co, Ltd. is used.

(A4) Polyamide: SD-5000 produced by Cheil Industries Inc. is used.

(A5) Polyphenylene ether: HR-8060 produced by Cheil Industries Inc. is used.

(A6) Polyethylene terephthalate: HS-7000 produced by Cheil Industries Inc. is used.

(B1 to B6) Brominated Diphenyl Ethane Mixture

The brominated diphenyl ethane mixtures prepared in Preparation Examples 1 to 6 are used. Compositions of the prepared brominated diphenyl ethane mixtures are represented in the following table. Analyses of the synthesized brominated diphenyl ethane mixtures are performed using a GC/MS after diluting given samples to a dilution factor of 2000 (0.5 mg/mL) with toluene to thereby completely dissolve the samples. Agilent 7683 injector-GC Agilent 7890N-MSD Agilent 5975C is used as measuring instruments. Measuring conditions are as follows: an inlet temperature is 320° C., a split ratio is splitless, a column is UA-1, a column flow rate is 1.0 ml/min, an oven temperature program is 40° C. (2 min) −40° C./min→200° C.-10° C./min→260° C.-20° C./min→340° C. (2 min), and an MS interface temperature is 280° C. The qualitative analysis is conducted by injecting 1 μl into a GC/MSD using an auto-sampler. The respective measured compositions are used based on the area. The Br content analysis is carried out using an IC. Br contents of the samples are measured by drawing up calibration curves using an IC-500 after injecting an excessive amount of oxygen into the sample and burning the samples using the injected oxygen.

TABLE 1

| Composition | Area ratio (%) | | | | | |
|---|---|---|---|---|---|---|
| | B1 | B2 | B3 | B4 | B5 | B6 |
| Low molecular weight materials (monobromo-, dibromo-, tribromo-, tetrabromo-diphenyl ethanes) | — | — | — | 1.5 | — | — |
| Pentabromo diphenyl ethane (Br5) | 1.6 | 1.4 | 0.9 | 1.9 | — | 20.3 |
| Hexabromo diphenyl ethane (Br6) | 83.0 | 77.6 | 71.2 | 65.7 | 57.4 | 21.9 |
| Heptabromo diphenyl ethane (Br7) | 13.5 | 13.4 | 13.8 | 12.8 | 15.0 | 39.2 |
| Octabromo diphenyl ethane (Br8) | 1.9 | 6.6 | 10.7 | 13.5 | 18.2 | 1.3 |
| Nonabromo diphenyl ethane (Br9) | — | 1.0 | 3.4 | 4.5 | 8.8 | 16.7 |
| Decabromo diphenyl ethane (Br10) | — | — | — | 0.1 | 0.6 | 0.6 |

(B7) Bromine-Based Flame Retardant

Saytex-8010 (Decabromo diphenyl ethane) with a Br content of 82% produced by Albemarle Corporation is used.

(B8) Flame Retardant

CP-2000 (TBBA) with a Br content of 58% produced by Albemarle Corporation is used.

(C) Flame Retarding Aid

Antimony trioxide: ANTIS-W produced by I1 Sung Antimony Co., Ltd. is used.

(D) Thermal Stabilizer

Irganox 1076 is used as a thermal stabilizer.

(E) Anti-Dripping Agent

TEFLON 7A-J produced by Dupont-Mitsui Polychemicals Co., Ltd. is used.

Examples 1 to 11 and Comparative Examples 1 to 8

After adding the respective foregoing components in the amounts represented in the following Tables 3 and 4, the components are uniformly mixed in a Henschel mixer for 3 to 10 minutes. Pellets are produced by extruding the mixture at an extrusion temperature of 180 to 280° C., a screw-rotating speed of 150 to 300 rpm and a composition feeding rate of 30 to 60 kg/hr in an ordinary twin extruder. After drying the produced pellets at 80° C. for 3 hours, samples are prepared by injecting the dried pellets using a 6-Oz injector under conditions of a molding temperature of 180 to 280° C. and a mold temperature of 40 to 80° C. After leaving the prepared samples at a temperature of 23° C. and a relative humidity of 50% for 40 hours, physical properties of the samples are measured by the following methods.

A specimen prepared for measuring thermal stability has a size of 100 mm×100 mm and is prepared in the same manner as described above. Thermal stability is measured by comparing a color difference between a tenth specimen obtained by successively injecting the pellets into specimens ten times at a predetermined temperature and a eleventh specimen obtained by injecting the pellets into the specimens eleven times and allowing the eleventh specimen to stay in the injector for 10 minutes.

(1) Izod impact strengths (kgf·cm/cm) of samples with a thickness of ⅛" are measured according to ASTM 256.

(2) Fluidity: Melt flow indexes (g/10 min) of the samples are measured according to ASTM D-1238 and are measured under the conditions corresponding to the respective resins represented in the following Table 2.

TABLE 2

| Thermoplastic resins | | Temperature | Weight |
|---|---|---|---|
| A1 | ABS | 200° C. | 5 Kg |
| A2 | HIPS | 200° C. | 5 Kg |
| A3 | PP | 230° C. | 2.16 Kg |
| A4 | PA | 265° C. | 2.16 Kg |
| A5 | PPE | 220° C. | 10 Kg |
| A6 | PET | 250° C. | 10 Kg |

(3) Thermal stability: Samples with a size of 200 mm×50 mm×2 mm are molded at 240° C. using a 10-oz IDE140ENII injector produced by LG Industrial Systems Co., Ltd. Discolored samples are molded by performing the injection molding operation again after allowing resin to stay in the injector for 10 minutes while continuously performing an injection molding operation. The measured color difference is represented as ΔE by measuring a difference between the color of a final sample obtained by finally injection molding the resin before allowing the resin to stay in the injector and color of a sample obtained by initially injection molding the resin after allowing the resin to stay in the injector. The colors of the samples are measured by a Minolta CM-3700 D spectrophotometer. Color difference values are calculated by a CIELAB-based color difference formula introduced in 1976 by Commission Internationale de l'Eclairage. The calculated color difference values are respectively classified into *L (Lightness/degrees of brightness and darkness), *a (Red to Green), and *b (Yellow to Blue) according to the illumination. ΔE is calculated from the following formula.

$$[\Delta E] = \{(\Delta L)^2 + (\Delta a)^2 + (\Delta b)^2\}^{0.5}$$

(4) Flame retardancies of samples with a thickness of ⅛" are measured according to UL 94 VB flame resistance regulations.

TABLE 3

|  |  | Examples | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Thermoplastic resins | A1, ABS | 100 | — | — | — | — | — | 100 | 100 | 100 | 100 | 100 |
|  | A2, HIPS | — | 100 | — | — | — | — | — | — | — | — | — |
|  | A3, PP | — | — | 100 | — | — | — | — | — | — | — | — |
|  | A4, PA | — | — | — | 100 | — | — | — | — | — | — | — |
|  | A5, PPE | — | — | — | — | 100 | — | — | — | — | — | — |
|  | A6, PET | — | — | — | — | — | 100 | — | — | — | — | — |
| Flame retardant | B1 | 16 | — | — | 20 | — | — | 17 | — | — | — | — |
|  | B2 | — | 16 | — | — | 20 | — | — | 16 | — | — | — |
|  | B3 | — | — | 21.8 | — | — | 20 | — | — | 16 | — | — |
|  | B4 | — | — | — | — | — | — | — | — | — | 16 | — |
|  | B5 | | | | | | | | | | | 16 |
|  | B6 | | | | | | | | | | | |
| Flame retarding aid | C($Sb_2O_3$) | 5 | 5 | 5 | 5 | 5 | 5 | 6 | 5 | 5 | 5 | 5 |
| Thermal stabilizer | | 0.5 | 0.5 | 0.5 | 0.5 | 0.5 | 0.5 | 0.5 | 0.5 | 0.5 | 0.5 | 0.5 |
| Anti-dripping agent | TEFLON 7A-J | 0.5 | 0.5 | 0.5 | 0.5 | 0.5 | 0.5 | — | 0.5 | 0.5 | 0.5 | 0.5 |
| Izod impact strength | | 24.5 | 9 | 5 | 20 | 5 | 20 | 23 | 24 | 25 | 23 | 24 |
| Flowability | | 3.5 | 11 | 20 | 40 | 20 | 60 | 3.6 | 3.6 | 3.4 | 3.5 | 3.5 |
| Thermal stability ($\Delta E$) | | 7.0 | 7.5 | 5.1 | 15 | 8.4 | 16.5 | 7.1 | 6.8 | 7.0 | 7.6 | 8.3 |
| Flame retardancy | | V-0 | V-0 | V-0 | V-0 | V-0 | V-0 | V-0 | V-0 | V-0 | V-0 | V-0 |

TABLE 4

|  |  | Comparative Examples | | | | | | | |
|---|---|---|---|---|---|---|---|---|---|
|  |  | 1 | 2 | 3 | 4 | 5 | 6 | 7 | 8 |
| Thermoplastic resins | A1, ABS | 100 | 100 | 100 | — | — | — | — | — |
|  | A2, HIPS | — | — | — | 100 | — | — | — | — |
|  | A3, PP | — | — | — | — | 100 | — | — | — |
|  | A4, PA | — | — | — | — | — | 100 | — | — |
|  | A5, PPE | — | — | — | — | — | — | 100 | — |
|  | A6, PET | — | — | — | — | — | — | — | 100 |
| Flame retardant | B6 | 16 | — | — | — | — | — | — | — |
|  | B7 Saytex 8010 | — | — | 14.6 | 14.7 | 20 | 18.3 | 18.3 | 18.3 |
|  | B8 TBBA | — | 21 | — | — | — | — | — | — |
| Flame retarding aid | Sb2O3 | 5 | 5 | 5 | 5 | 5 | 5 | 5 | 5 |
| Thermal stabilizer | | 0.5 | 0.5 | 0.5 | 0.5 | 0.5 | 0.5 | 0.5 | 0.5 |
| Anti-dripping agent | FEFLON 7A-J | 0.5 | 0.5 | 0.5 | 0.5 | 0.5 | 0.5 | 0.5 | 0.5 |
| Izod impact strength | | 20 | 19 | 13 | 7 | 4 | 15 | 6 | 10 |
| Flowability | | 3.6 | 5.5 | 2 | 8 | 50 | 5 | 3 | 3 |
| Thermal stability ($\Delta E$) | | 12 | 15 | — | — | — | — | — | — |
| Flame retardancy | | V-0 | V-0 | V-0 | V-0 | V-0 | V-0 | V-0 | V-0 |

As illustrated in Tables 3 and 4, Examples 1 and 7 to 11 which include flame retardants of the present invention having specific bromine contents show remarkably improved impact strengths and maintain excellent flowabilities as compared with Comparative Examples 2 and 3 using TBBA and Decabromo diphenyl ethane as the flame retardants. Moreover, Example 9 shows remarkably improved thermal stability as compared with Comparative Example 1 having a composition different from the flame retardant of the present invention. Further, Examples 2 to 6 also show excellent impact strengths and flowabilities when the same resin composition is applied as compared to Comparative Examples 3 to 7.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A brominated diphenyl ethane mixture, comprising about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane, and about 0 to about 5% by weight of decabromodephenyl ethane.

2. The brominated diphenyl ethane mixture as claimed in claim 1, wherein said brominated diphenyl ethane mixture comprises about 0 to about 2% by weight of pentabromodiphenyl ethane, about 60 to about 85% by weight of hexabromodiphenyl ethane, about 1 to about 15% by weight of heptabromodiphenyl ethane, about 5 to about 25% by weight of octabromodiphenyl ethane, about 0 to about 9% by weight of nonabromodiphenyl ethane, and about 0 to about 5% by weight of decabromodephenyl ethane.

3. The brominated diphenyl ethane mixture as claimed in claim 1, wherein the brominated diphenyl ethane mixture comprises about 55 to about 75% by weight of hexabromodiphenyl ethane, about 11 to about 16% by weight of heptabromodiphenyl ethane, about 10 to about 20% by weight of octabromodiphenyl ethane, and about 1 to about 9% by weight of nonabromodiphenyl ethane.

4. The brominated diphenyl ethane mixture as claimed in claim 1, wherein the brominated diphenyl ethane mixture comprises about 0.1 to about 2% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, and about 1 to about 7% by weight of nonabromodiphenyl ethane.

5. The brominated diphenyl ethane mixture as claimed in claim 1, wherein the brominated diphenyl ethane mixture comprises about 0.1 to about 2% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, about 1 to about 7% by weight of nonabromodiphenyl ethane, and about 0.01 to about 1% by weight of decabromodephenyl ethane.

6. The brominated diphenyl ethane mixture as claimed in claim 1, wherein the brominated diphenyl ethane mixture comprises about 55 to about 83% by weight of hexabromodiphenyl ethane, about 7 to about 17% by weight of heptabromodiphenyl ethane, about 5 to about 23% by weight of octabromodiphenyl ethane, about 1 to about 7% by weight of nonabromodiphenyl ethane, and about 0.01 to about 1% by weight of decabromodephenyl ethane.

7. The brominated diphenyl ethane mixture as claimed in claim 1, wherein the brominated diphenyl ethane mixture comprises about 0 to about 2% by weight of one or more bromodiphenyl ethane compounds selected from the group consisting of monobromodiphenyl ethane, dibromodiphenyl ethane, tribromodiphenyl ethane, and tetrabromodiphenyl ethane.

8. The brominated diphenyl ethane mixture as claimed in claim 1, wherein the brominated diphenyl ethane mixture has an average bromine content of about 64 to about 81% by weight.

9. A resin composition comprising the brominated diphenyl ethane mixture as defined in claim 1 as a flame retardant.

10. The resin composition as claimed in claim 9, wherein the resin composition comprises: about 100 parts by weight of a thermoplastic resin (A); and about 1 to 30 parts by weight of the brominated diphenyl ethane mixture (B).

11. The resin composition as claimed in claim 10, wherein the thermoplastic resin (A) comprises polyolefin, an aromatic vinyl based polymer, a rubber-modified aromatic vinyl polymer, a rubber modified aromatic vinyl-vinyl cyanide copolymer, an aromatic vinyl-vinyl cyanide copolymer, polyvinyl chloride, polyester, polyamide, polyphenylene oxide, polyphenylene sulfide, polycarbonate, or a combination thereof.

12. The resin composition as claimed in claim 10, wherein the resin composition comprises an additive selected from a flame retardant, a flame retarding aid, an anti-dripping agent, a heat stabilizer, a release agent, a weatherability stabilizer, a halogen stabilizer, a lubricant, a filler, a light stabilizer, an antioxidant, a coloring agent, an antistatic agent, an impact modifier, or a combination thereof.

13. A molded article produced by molding the resin composition of claim 12.

14. The molded article as claimed in claim 13, wherein when the thermoplastic resin is an acrylonitrile butadiene styrene (ABS) copolymer, and wherein said resin composition has an Izod impact strength of about 12 to about 60 kgf·cm/cm for a 1/8" thick sample measured in accordance with ASTM 256, a melt flow index of about 0.2 to about 20 g/10 min measured in accordance with ASTM D-1238 at 200° C., a flame retardancy of V-0 for a 1/8" thick sample measured in accordance with UL 94 VB regulations, and a color change of about 10 or less based on ΔE measured after a residence time of 10 minutes at 250° C.

15. The molded article as claimed in claim 13, wherein when the thermoplastic resin is a rubber modified polystyrene resin (HIPS), and wherein said resin composition has an Izod impact strength of about 6 to about 25 kgf·cm/cm for a 1/8" thick sample measured in accordance with ASTM 256, a melt flow index of about 2 to about 40 g/10 min measured in accordance with ASTM D-1238 at 200° C., a flame retardancy of V-0 for a 1/8" thick sample measured in accordance with UL 94 VB regulations, and a color change of about 10 or less based on ΔE measured after a residence time of 10 minutes at 250° C.

16. The molded article as claimed in claim 13, wherein when the thermoplastic resin is polyamide (PA), and wherein said resin composition has an Izod impact strength of about 10 to about 120 kgf·cm/cm for a 1/8" thick sample measured in accordance with ASTM 256, a melt flow index of about 3 to about 200g/10 min measured in accordance with ASTM D-1238 at 265° C., a flame retardancy of V-0 for a 1/8" thick sample measured in accordance with UL 94 VB regulations, and a color change of about 20 or less based on ΔE measured after a residence time of 10 minutes at 250° C.

17. The molded article as claimed in claim 13, wherein when the thermoplastic resin is polyphenylene ether (PPE), and wherein said resin composition has an Izod impact strength of about 3 to about 50 kgf·cm/cm for a 1/8" thick sample measured in accordance with ASTM 256, a melt flow index of 0.1 to about 100 g/10 min measured in accordance with ASTM D-1238 at 220° C., a flame retardancy of V-0 for a 1/8" thick sample measured in accordance with UL 94 VB regulations, and a color change of about 10 or less based on ΔE measured after a residence time of 10 minutes at 250° C.

18. The molded article as claimed in claim 13, wherein when the thermoplastic resin is polyethylene terephthalate (PET), and wherein said resin composition has an Izod impact strength of about 3 to about 70 kgf·cm/cm for a 1/8" thick sample measured in accordance with ASTM 256, a melt flow index of about 1 to about 100 g/10 min measured in accordance with ASTM D-1238 at 250° C., a flame retardancy of V-0 for a 1/8" thick sample measured in accordance with UL 94 VB regulations, and a color change of about 20 or less based on ΔE measured after a residence time of 10 minutes at 250° C.

19. The molded article as claimed in claim 13, wherein when the thermoplastic resin is polypropylene (PP), and wherein said resin composition has an Izod impact strength of about 3 to about 70 kgf·cm/cm for a 1/8" thick sample measured in accordance with ASTM 256, a melt flow index of about 1 to about 100 g/10 min measured in accordance with ASTM D-1238 at 230° C., a flame retardancy of V-0 for a 1/8" thick sample measured in accordance with UL 94 VB regulations, and a color change of about 10 or less based on ΔE measured after a residence time of 10 minutes at 220° C.

20. A method of simultaneously improving impact resistance, flowability and flame resistance of a thermoplastic resin, comprising adding a brominated diphenyl ethane mixture as a flame retardant to a thermoplastic resin, wherein the brominated diphenyl ethane mixture comprises about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane and about 0 to about 5% by weight of decabromodephenyl ethane and has a bromine content of about 72 to about 80% by weight.

21. The molded article as claimed in claim 14, wherein said resin composition has a color change of about 8.3 or less based on $\Delta E$ measured after a residence time of 10 minutes at 250° C.

* * * * *

UNITED STATES PATENT AND TRADEMARK OFFICE
CERTIFICATE OF CORRECTION

PATENT NO.        : 7,977,421 B2  
APPLICATION NO.   : 12/512134  
DATED             : July 12, 2011  
INVENTOR(S)       : Sung Hee Ahn et al.

Page 1 of 1

It is certified that error appears in the above-identified patent and that said Letters Patent is hereby corrected as shown below:

Title Page, Item (57) Abstract should read --

ABSTRACT

A brominated diphenyl ethane mixture of the present invention comprises about 0 to about 2% by weight of pentabromodiphenyl ethane, about 55 to <u>about</u> 85% by weight of hexabromodiphenyl ethane, about 1 to <u>about</u> 20% by weight of heptabromodiphenyl ethane, about 1 to <u>about</u> 25% by weight of octabromodiphenyl ethane, about 0 to about 10% by weight of nonabromodiphenyl ethane, and about 0 to about 5% by weight of decabromodephenyl ethane. The brominated diphenyl ethane mixture can be added to thermoplastic resin as a flame retardant, can exhibit excellent compatibility with thermoplastic resins, can minimize the generation of environmental problems, and can obtain excellent impact resistance, thermal stability, weatherability and flowability as well as improved flame resistance.

Signed and Sealed this  
Fifteenth Day of November, 2011

David J. Kappos  
*Director of the United States Patent and Trademark Office*